April 28, 1970     E. J. NAGY     3,508,501
BRACKET ARRANGEMENT FOR SECURING CARGO CONTAINERS ON VEHICLES
Filed May 24, 1968     2 Sheets-Sheet 1
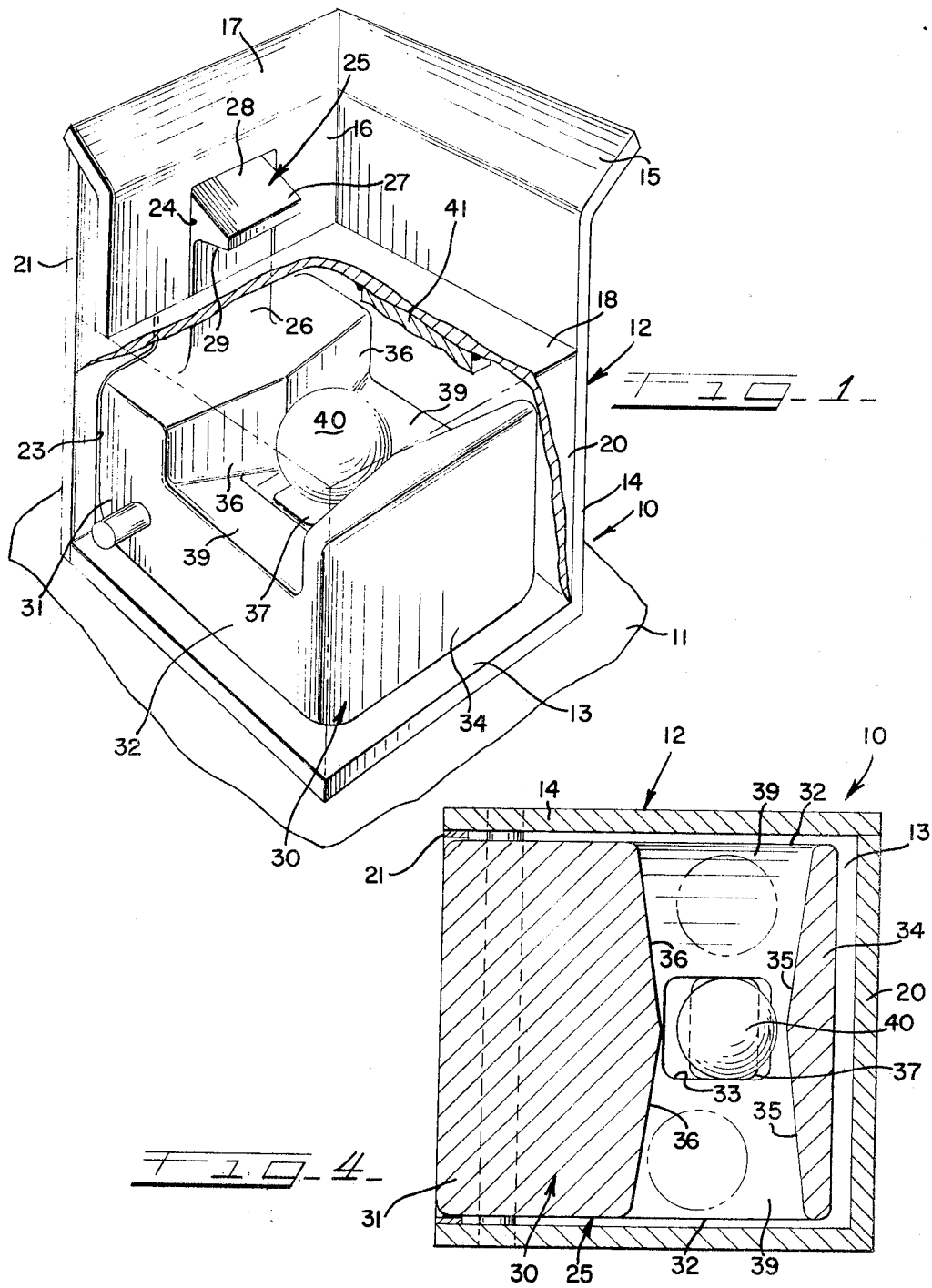
INVENTOR
ERNEST J. NAGY
BY Helmuth O. Vogel
ATT'Y.

April 28, 1970          E. J. NAGY          3,508,501
BRACKET ARRANGEMENT FOR SECURING CARGO CONTAINERS ON VEHICLES
Filed May 24, 1968          2 Sheets-Sheet 2
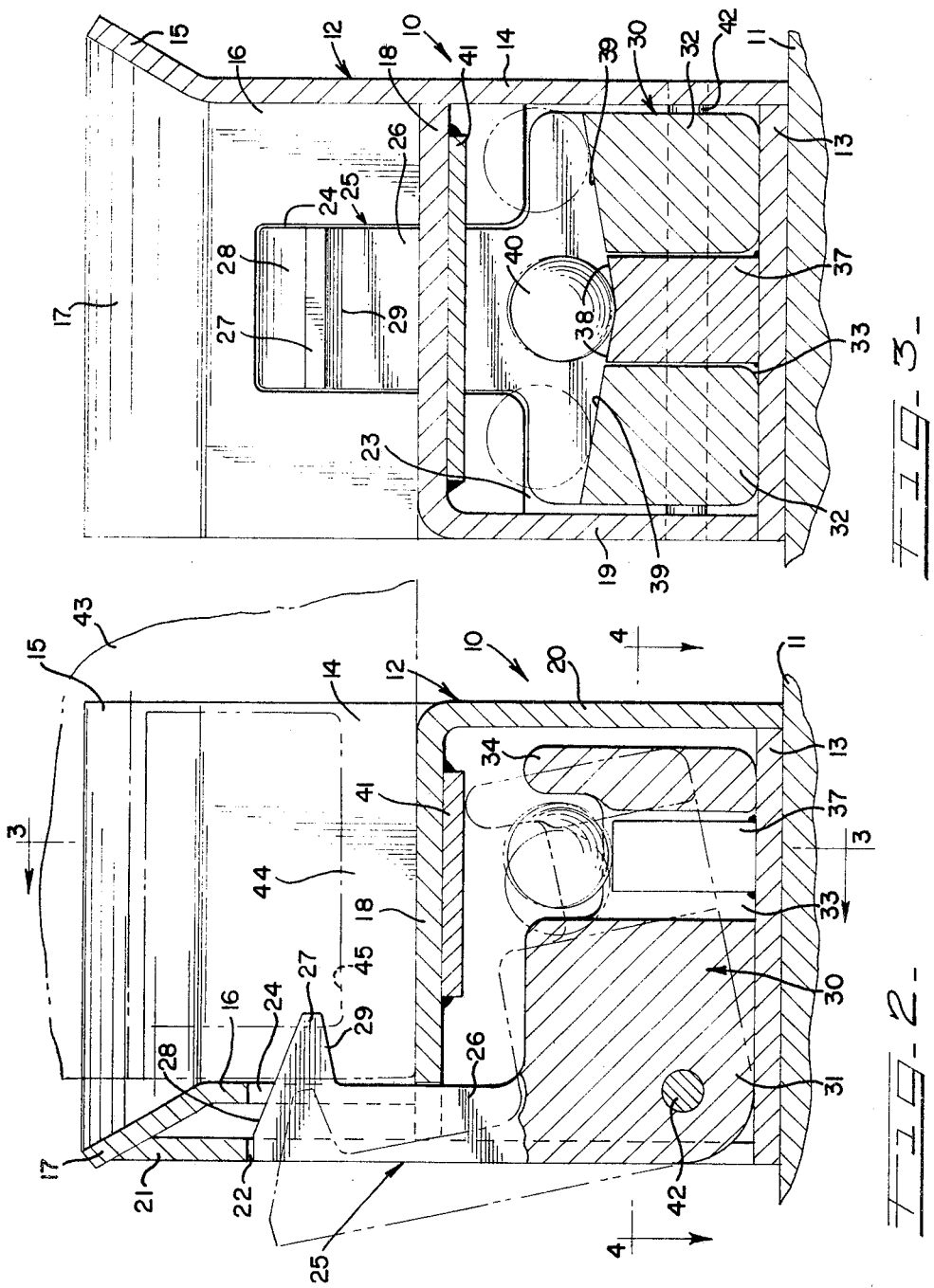
INVENTOR
ERNEST J. NAGY
BY
ATT'Y.

United States Patent Office 3,508,501
Patented Apr. 28, 1970

3,508,501
BRACKET ARRANGEMENT FOR SECURING CARGO CONTAINERS ON VEHICLES
Ernest J. Nagy, Munster, Ind., assignor to Pullman Incorporated, Chicago, Ill., a corporation of Delaware
Filed May 24, 1968, Ser. No. 731,991
Int. Cl. B61d 45/00
U.S. Cl. 105—366                     12 Claims

ABSTRACT OF THE DISCLOSURE

A bracket arrangement for securing a cargo container on a vehicle having a platform on which the container is supported, the vehicle being subject to acceleration and deceleration forces and tilting of the platform during normal operation wherein latch means is provided to restrain the container against upward movement, the said latch means permitting normal unloading movement of the container when the vehicle is at rest, said latch means including movable means responsive to the acceleration and deceleration forces on the vehicle and inclination of the platform to lock said latch mechanism in engaged position with the container to prevent any vertical displacement. The movable means includes a rolling member which is movable from an inert position to a position whereupon it blocks movement of the latch mechanism to maintain the same in the locked position.

BACKGROUND OF THE INVENTION

Field of the invention

The field of invention is concerned with transportation vehicles such as over-the-highway trucks and trailers and also particularly railway flat cars which are adapted for container operation. The specific field is concerned with tie-down devices such as container brackets, one of which is generally positioned at the four corners of a container to restrain the same against horizontal and vertical movements relative to the vehicle.

Description of the prior art

The prior art discloses container brackets which are adapted to be supported on the platform of a vehicle and these include abutment means adapted to engage the sides of the container to prevent horizontal displacement relative to the platform. To prevent vertical displacement of the container during operation of the vehicle these brackets also generally include restraining elements in the form of sliding or pivoting elements which are supported on the brackets and are moved into mating or engaging position with openings provided in the corner brackets of the containers. In this position these elements are generally locked by suitable latching mechanisms which prevent any vertical displacement of the container during shipment. Such elements must generally be manually unlatched and withdrawn from the corner openings when the container reaches its destination and is to be unloaded from the platform. The present invention eliminates the manual unlocking of the bracket latching means when it is desired to move the cargo container from the platform.

SUMMARY

A bracket arrangement positioned on the platform of a vehicle for supporting the corner of a container against horizontal and vertical movements, which includes a latching element that prevents vertical displacement of the container during certain operating conditions of the vehicle and which automatically moves to a disengaged position relative to the container when the container is lifted vertically for removal from the platform during unloading operations.

BRIEF DESCRIPTION OF THE DRAWINGS

FIG. 1 is a perspective view of a container bracket arrangement seated on a portion of a platform of a vehicle, the said view having portions broken away to show parts of a latching mechanism;

FIG. 2 is a cross-sectional view through the container bracket arrangement shown in FIG. 1;

FIG. 3 is a cross-sectional view taken substantially along the line 3—3 of FIG. 2; and FIG. 4 is a cross-sectional view taken substantially along the line 4—4 of FIG. 2.

DESCRIPTION OF THE PREFERRED EMBODIMENT

Referring now to the drawings, a container bracket arrangement 10 is seated on a platform or deck 11 of a vehicle. The platform 11 may be on a highway vehicle or railroad car particularly adapted for transporting containers. In railroad flat cars four of the bracket arrangements 10 are required for each container carried on the car. In conventional arrangements for container transport the bracket arrangements are each positioned to engage and support the four corners of the container to tie the same down against longitudinal and vertical forces to which the railroad car is subjected. These forces generally are due to sudden accelerations and decelerations which may take place as a result of coupling procedures which require impacting one car into another for engaging the automatic couplers which are provided on the railway cars. Further, such forces are also generated by train operation which includes operation around curves and on inclines of various sorts. Thus while only one bracket arrangement has been disclosed it is understood that one is provided at each corner of the container for supporting the same in conventional manner.

Each bracket arrangement 10 comprises a housing 12 having a base plate 13 suitably secured to the platform 11 of the vehicle. The bracket arrangement 10 is a weldment and various parts of the housing 12 therefore are suitably welded together. A vertical wall 14 provides one side of the housing 12 and includes a tapering upper end flange 15. A second vertical wall 16 extends normal to the wall 14, is connected thereto and includes at its upper end a tapering flange 17. A horizontally extending load-supporting wall 18 is suitably connected to the walls 14 and 16 and to vertical supporting walls 19 and 20. A vertical wall 21 is suitably connected to the base plate 13 and at its upper end to the upper flange 17 of the wall 16. The wall 21 as best shown in FIG. 2 is provided with a slot 22 which merges with an enlarged opening 23 in the wall 21. A slot 24 is provided in the wall 16 and is in alignment with the slot 22.

A latch member is designated generally at 25 and includes an upright arm 26 providing a restraining hook 27 projecting horizontally from the vertical arm 26. The hook 27 is provided with an upper tapering surface 28 and a lower engaging surface 29. The upright arm 26 is provided at its lower end with a stop member 30 extending laterally. The stop member 30 includes a generally block-shaped member 31 having a pair of stop elements 32 which are separated by a rectangular opening 33.

The stop elements 32 are interconnected by means of a vertical retaining wall 34 horizontally spaced from the block-shaped member 31. Referring particularly to FIG. 4 the wall 34 includes a pair of inner tapering surfaces 35 which converge in the direction of the opening 33. Similarly the block-shaped member 31 is provided with a pair of inner tapering surfaces 36 which converge in the direction of the opening 33. A ball support 37 is rigidly secured to the base 13. The ball support 37 is disposed within the opening 33 provided between the stop elements 32. The ball support 37 includes a pair of converging surfaces 38 as shown in FIG. 3 which provide a pocket or seat for a spherical element such as a ball 40. A stop plate 41 is secured to the underneath side of the wall 18 and above the ball 40. The latch member 25 may be hinged or pivoted about a pivot pin 42 connected to the block-shaped member 31, said pin 42 being suitably supported on the walls 14 and 19.

FIG. 2 shows a container 43 having its corners supported on the load-supporting wall 18. The container 43 includes a corner bracket 44 having an opening 45 for receiving the restraining hook 27 in engaging relation.

THE OPERATION

When a container is loaded by means of a crane or other handling implement onto a railway flat car or other vehicle the corners of the container in its downward movement are guided by the tapering flanges 15 and 17 into a position whereupon the corners are seated upon the load-supporting walls 18. Since the restraining hook 27 is provided with an upper tapering surface 28 the corners slide on this surface and displace the latch member 25 to pivot so that the restraining hook 27 is moved outwardly whereby the container is then firmly seated upon the supporting wall 18. In this position the latch element 25 returns to the position shown in FIG. 2 wherein the restraining hook 27 is disposed within the opening 45 of the corner bracket 44.

During loading of the container 43 the railway car is generally in a non-moving position and in such position the ball 40 is seated upon the support 37 in an inert manner. Similarly when the car is to be unloaded the ball 40 is in this position and it is of course obvious that the container 43 can now again be moved upwardly whereupon the latch member 25 automatically is moved to a non-engaging position to permit such unloading. Further the walls 14 and 16 of the combined bracket arrangements on which a container 43 is supported serve to prevent horizontal displacement of the container and provides a firm tie-down during the railroad operation. During railroad operation the cars of course are subjected to impacts causing sudden decelerations and accelerations. Further the car may during curving or in the event of travel on inclines assume a non-horizontal position which can generate forces tending to unseat the container in a vertical direction from the supporting walls 18.

During such conditions the ball 40 moves upwardly on the inclined surfaces 39 of the stop elements 32 as shown in FIG. 3 whereupon the balls 40 are in substantial engagement with the stop plate 41 and thus prevent tilting movement of the latch member 25 out of the engaging position of the hook 27 as best shown in FIG. 2. The container 43 thus is secured against vertical displacement from the bracket arrangements 10 by means of the motion-responsive ball 40 which acts as a stop to prevent movement of the arm 26 to the release position of the restraining hook 27. Thus in the lock arrangement the ball 40 engages and is positioned between the surfaces 39 and the stop plate 41 thereby obstructing any hinging movement of the latch member 25. The walls 35 and 36 taper in the direction of the support 37 thus serving to facilitate rolling of the ball 40 into the inert supported position shown in FIG. 4. During impacts therefore and in various positions of the railway car where there might be a tendency for sudden vertical forces to be generated on the container 43 tending to lift it from its seat, it is thus firmly retained against any such upward movement. Yet when the car reaches its destination and the platform 11 is in a substantially horizontal position it is a simple matter to hoist the container 43 upwardly whereupon latch elements 25 can now be disengaged since the ball 40 is in an inert non-operative position. In this position when the latch element 25 is hinged, the elements 32 would straddle the support 37 and pass along the sides of the ball 40 without creating any movement of said ball from the inert position.

What is claimed is:

1. A container bracket arrangement for securing a cargo container supported on the platform of a vehicle, comprising:
   a latch means pivotally supported on said vehicle relative to said platform,
   said latch means including restraining means adapted to engage said container in lock position on said platform against upward movement,
   said latch means and restraining means being responsive to upward movement during unloading of said container to move to a release position,
   movable means associated with said latch means including a freely traveling spherical element adapted to be supported on said latch means which during said release position is in an inert nonoperative position relative to said latch means, and
   said spherical element being movable to a supported position on said latch means in response to acceleration and deceleration forces on said vehicle, and positions of said platform inclined from the horizontal to block pivotal movement of said latch means and maintain the same in lock position.

2. A container bracket arrangement for securing a cargo container supported on the platform of a vehicle, comprising:
   a latch means movably supported on said vehicle relative to said platform,
   said latch means including restraining means adapted to engage said container in lock position on said platform against upward movement,
   said latch means and restraining means being responsive to upward movement during unloading of said container to move to a release position,
   movable means associated with said latch means including a freely traveling element adapted to be supported on said latch means which during said release position is in an inert non-operative position relative to said latch means during movement of said latch means, and
   said freely traveling element being movable to a supported position on said latch means in response to acceleration and deceleration forces on said vehicle, and positions of said platform inclined from the horizontal to maintain said latch means in lock position.

3. A container bracket arrangement in accordance with claim 2,
   including abutment means on said platform adapted to engage and retain a container against longitudinal and lateral movement relative to said vehicle resulting from said forces on said vehicle and inclined position of said platform.

4. A container bracket arrangement in accordance with claim 2,
   said latch means including an upright arm pivotally supported on said platform and having at its upper end said restraining means,
   a stop member on said arm adjacent the pivotal connection of said arm and extending laterally with respect to said arm,
   said stop member including a stop element,
   a support supported on said platform adjacent said stop element,
   said stop element having an inclined surface tapering toward said support, adjacent one side thereof,
   said freely traveling element being supported on said support during said release position,
   second stop means disposed in spaced relation with respect to said first stop means,
   said freely traveling element moving upwardly on said inclined surface during said forces on said vehicle and inclined position of said platform to engage said second stop means and restrain said arm from pivotal movement.

5. A container bracket arrangement in accordance with claim 2,
    said traveling element comprising a rollable member.

6. A container bracket arrangement in accordance with claim 5,
    said rollable member comprising a ball.

7. A container bracket arrangement in accordance with claim 6,
    said second stop member being spaced above said first stop member a distance only to permit free rolling movement of said ball.

8. A container bracket arrangement in accordance with claim 7,
    said first stop member including a second stop element having an inclined surface tapering toward another side of said support, for receiving said traveling ball.

9. A container bracket arrangement in accordance with claim 8,
    said first and second stop elements straddling said support.

10. A container bracket arrangement in accordance with claim 8,
    said stop support member, and said ball being contained within a housing.

11. A container bracket in accordance with claim 8,
    said support having inclined converging surfaces supporting said ball in an inert position.

12. A container bracket in accordance with claim 8,
    said stop member including upwardly extending vertical walls disposed on opposite sides of said support, said walls each having a pair of vertical surfaces converging toward said support.

References Cited

UNITED STATES PATENTS

| | | | |
|---|---|---|---|
| 1,471,111 | 10/1923 | Eder | 105—366 |
| 1,966,492 | 7/1934 | Fildes | 105—366 |
| 2,424,429 | 7/1947 | Bamberg | 105—366 |
| 3,399,921 | 9/1968 | Trost et al. | 296—35 |

DRAYTON E. HOFFMAN, Primary Examiner

U.S. Cl. X.R.

248—361